United States Patent
Zollner

[15] 3,702,092
[45] Nov. 7, 1972

[54] PISTONS FOR ENGINES
[72] Inventor: Fred Zollner, Fort Wayne, Ind.
[73] Assignee: Zollner Corporation, Fort Wayne, Ind.
[22] Filed: May 3, 1971
[21] Appl. No.: 139,843

Related U.S. Application Data

[63] Continuation of Ser. No. 850,819, Aug. 18, 1969, abandoned.

[52] U.S. Cl. .................................92/187, 308/2
[51] Int. Cl. .........................F16j 1/14, F16c 9/04
[58] Field of Search...............92/157, 172, 187–191; 123/197 A, 193 P, 41.58, 193; 287/20 P, 96; 29/156.5, 156.5 A; 308/37, 2; 74/596

[56] References Cited

UNITED STATES PATENTS

| | | | |
|---|---|---|---|
| 1,477,622 | 12/1923 | Aab................................308/2 |
| 1,922,707 | 8/1933 | Newcomb..................308/2 X |
| 1,936,158 | 11/1933 | Dyer.....................29/156.5 A |
| 1,961,789 | 6/1934 | Roth..............................308/2 |
| 2,418,245 | 4/1947 | Buckwalter..............308/37 X |
| 2,687,931 | 8/1954 | Flynn, Jr..................92/187 X |
| 2,851,319 | 9/1958 | Pitner......................92/187 X |
| 3,292,244 | 12/1966 | Cass........................123/193 P |
| 3,479,929 | 11/1969 | Fangman..................287/20 P |

FOREIGN PATENTS OR APPLICATIONS

| | | | |
|---|---|---|---|
| 718,722 | 3/1942 | Germany...................29/156.5 |
| 808,300 | 8/1951 | Germany........................308/2 |
| 813,597 | 5/1959 | Great Britain.................308/2 |

*Primary Examiner*—Martin P. Schwadron
*Assistant Examiner*—Irwin C. Cohen
*Attorney*—Elmer Jamison Gray

[57] ABSTRACT

An engine piston with opposed piston pin bosses depending from the head of the piston and laterally spaced apart. A piston pin is secured within openings in the bosses, such openings being aligned transversely whereby the piston pin also is disposed transversely of the piston. The pin is formed with a plurality of eccentrically disposed holes of selected lengths extending longitudinally of the piston pin. Such holes are spaced predetermined distances apart and are arranged one above another while preferably occupying in whole less area than the solid area of the pin adjoining said holes. These holes in certain instances may be circular in shape and in number ranging for examples from two to six. In other instances the holes may be either rectilinear, oval or approximately triangular in shape and vary in number such for example as three or four thereof.

6 Claims, 15 Drawing Figures

PATENTED NOV 7 1972 3,702,092

INVENTOR.
FRED ZOLLNER

PATENTED NOV 7 1972 3,702,092

INVENTOR.
FRED ZOLLNER
BY Elmer Jamison Gray
ATTORNEY

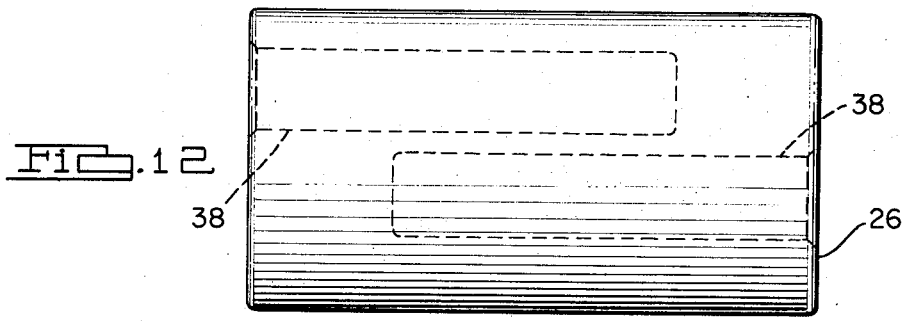
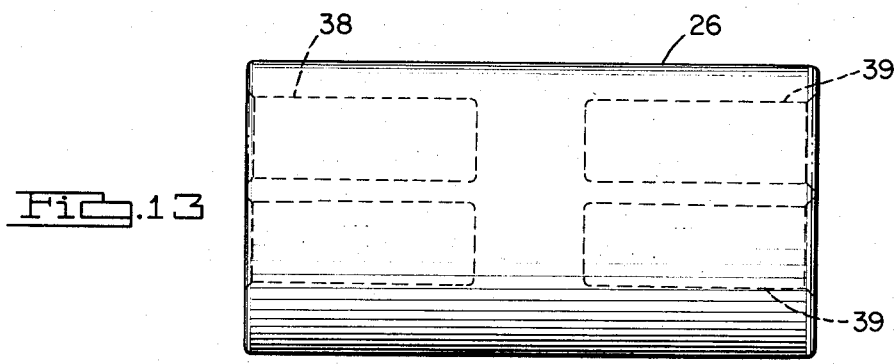
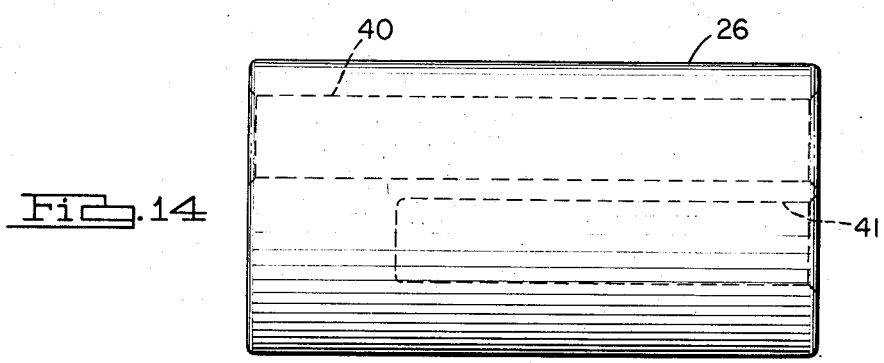
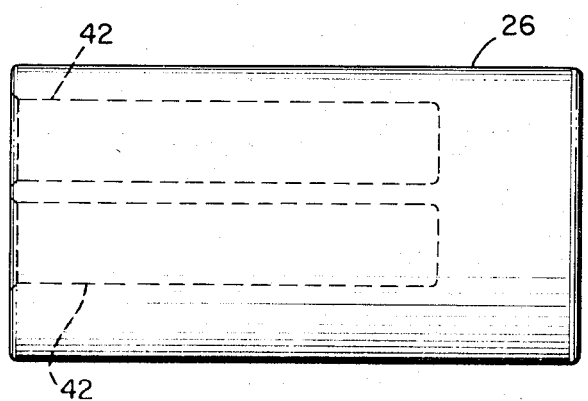
INVENTOR.
FRED ZOLLNER

PISTONS FOR ENGINES

This application is a streamline continuation of application Ser. No. 850,819, filed Aug. 18, 1969, and now abandoned.

This invention relates in general to pistons for engines and preferably to pistons for internal combustion engines of relatively high output, such pistons in preferred although not exclusive practice being cast in one piece in a permanent mold and composed of an aluminum alloy.

As herein illustrated a suitably selected piston is provided with laterally spaced piston pin bosses depending from the piston head which, in accordance with custom, is formed with annular ring grooves to receive the piston rings. These bosses are formed with spaced aligned openings to receive the transverse piston pin which is securely anchored therein. As will be understood this pin provides the medium for pivotally connecting to the piston the upper end of the connecting rod which in the engine depends therefrom and, according to practice, is connected at its lower end to the crank shaft of the engine.

In accordance with considerable existing practice in the industry constant attempts have been made to obtain the lightest weight piston pins practicably operable for adequately successful engine operation. Such attempts have been recognized as important although necessarily requiring the variation of wall thicknesses of production pistons in order to obtain piston pins as light as possible and practicable yet capable of withstanding the stresses involved in the particular engines in which the pistons are to be produced for use. With the view to securing the desired results there have been utilized piston pins designed so that each pin is provided with a single center hole of a diameter intended to afford satisfactory operation.

Piston pins of lightened or reduced weight as above indicated have been found highly deficient and disadvantageous in connection, for example, with so-called high output internal combustion engines, especially Diesel engines. Such pin in use will have deflection, distortion, as well as ovality which have two detrimental effects. First, these conditions of deflection, distortion and ovality repeated every power cycle imposed heavy stresses on the piston pin bosses and causes cracking or fracturing thereof. And, second, the pin in many instances is so distorted as to cause high unit pressure with resultant galling of the piston pin bosses. As a consequence, manufacturers in frequency cases have had to disregard weight saving considerations and install solid piston pins in which the center hole is eliminated.

An important object of the present invention is largely to eliminate the foregoing deficiencies and disadvantages or at least in a particular engine to minimize considerably the disadvantages incident to deflection, distortion, ovality and other defects in the single hole piston pin and approach the performance of a solid pin within an acceptable weight range. It should be understood that the piston pins other than pins as herein disclosed by way of examples may be lighter or heavier as well as embodying variations in size and hence in weight. It will also be understood as a feature hereof that the piston pins herein illustrated and described will have materially less deflection than single hole pins and will possess the advantage of being materially lighter in weight than solid pins.

Other objects of this invention will appear in the following description and appended claims, reference being had to the accompanying drawings forming a part of this specification wherein like reference characters mainly designate corresponding or similar parts in the several views.

Figure 5:
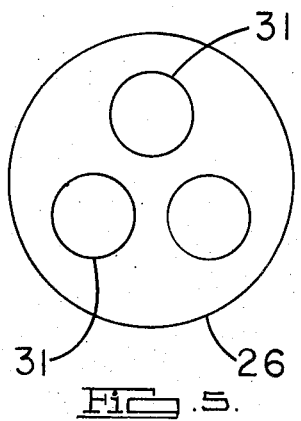
FIG. 5 illustrates a similar end view in which the pin has an odd number, namely, three piston pin holes.
Figure 7:
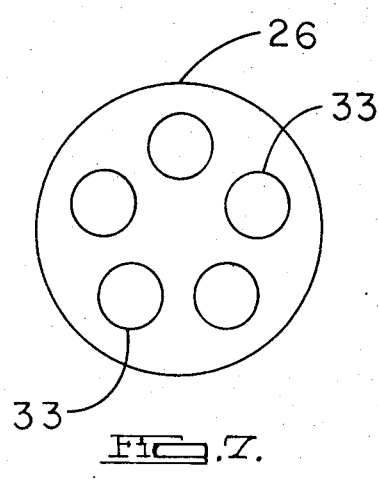

FIG. 7 similarly to FIG. 5 shows an odd number, namely, five piston pin holes.

Figure 6:
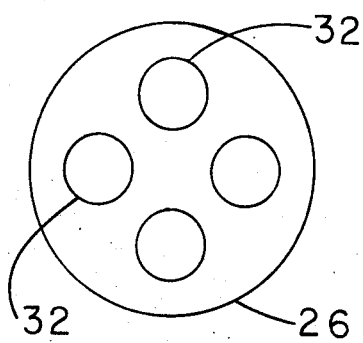
FIG. 6 illustrates another similar end view showing an even number, namely, four piston pin holes.
Figure 8:
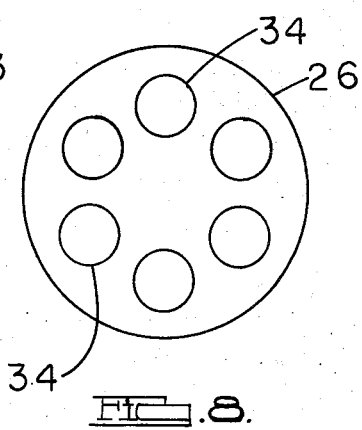

FIG. 8 as in FIG. 6 shows an even number, namely, six piston pin holes.

Figure 9:
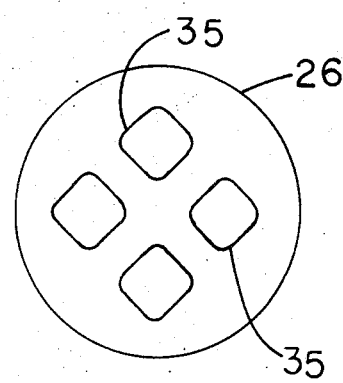

FIG. 9 corresponds to FIG. 6 excepting that the four piston pin holes shown therein are substantially square or rectilinear.

Figure 10:
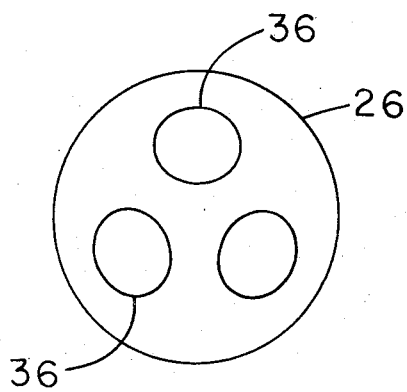

FIG. 10 corresponds to FIG. 5 excepting that the three illustrated piston pin holes are somewhat larger and oval in shape.

Figure 11:
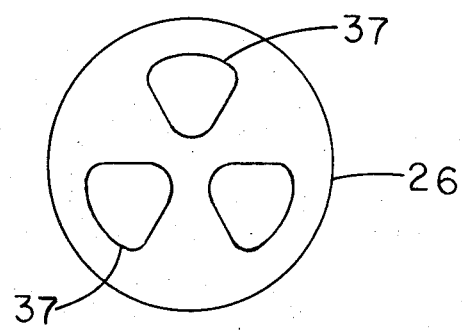

FIG. 11 as in FIGS. 5 and 10 shows three piston pin holes which, however, are somewhat larger and of generally triangular shape.

FIG. 12 shows the piston pin holes extending from opposite ends of the pin somewhat less than the length thereof.

FIG. 13 shows a series of four or a suitable number of holes extending in corresponding directions from opposite ends of the pin but foreshortened as to the length of the pin.

FIG. 14 is similar to FIG. 12 excepting that the upper of the holes extends the full length of the pin.

FIG. 15 illustrates a pin having the holes corresponding to the upper hole shown in FIG. 12.

With reference to the present invention as to which various embodiments have been selected for illustration and explanation by way of examples it will be understood that the invention is not limited in its application to the details of construction and arrangement of parts illustrated in the accompanying drawings and described herein, since the invention is capable of other embodiments and of being practiced or carried out in various ways. Also it is to be understood that the phraseology or terminology employed herein is for the purpose of description and not of limitation.

Figure 1:
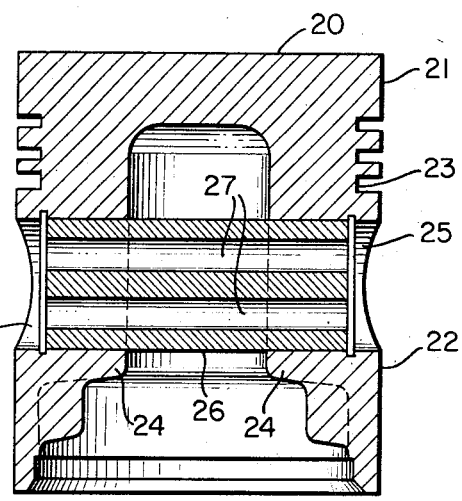
FIG. 1 is a central vertical sectional view of a piston preferably of an aluminum alloy having laterally spaced piston pin openings within which is securely mounted a piston or wrist pin having an even number of multiple holes therethrough.
Figure 2:
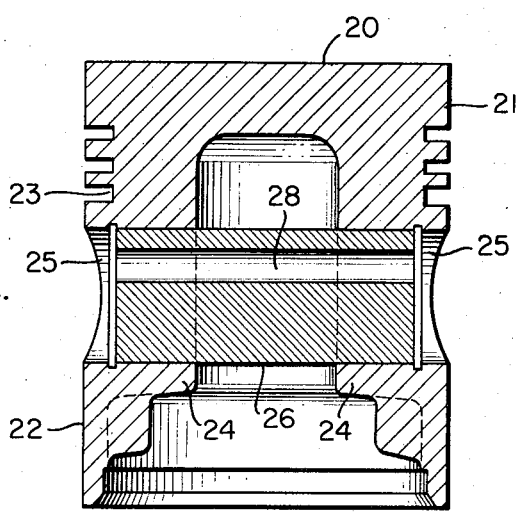
FIG. 2 illustrates a suitable piston similar to FIG. 1 having securely mounted within the piston pin openings a piston or wrist pin provided with an odd number or multiple holes therethrough.

For exemplary purposes and not limitation there is illustrated in FIGS. 1 and 2 a suitably selected piston, generally indicated at 20, which is cast in one piece, such as in a permanent mold, and is preferably of a suitable aluminum alloy. As in this example the piston is provided with a piston head 21 and a depending skirt 22. This piston head is formed with a suitable number of annular ring grooves 23 to receive the piston rings. The piston as in customary practice is provided with depending opposed piston or wrist pin bosses 24 having aligned piston pin or wrist pin openings 25. As exemplified by way of example in FIGS. 1 and 2 a suitable piston pin 26 is securely mounted in the opposed piston pin openings 25, this pin in each instance being shown on a reduced scale as compared with other illustrations herein.

Figure 3:
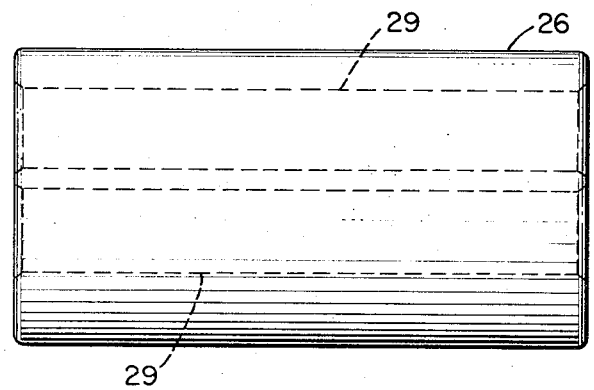
FIG. 3 illustrates a side view of a piston pin showing in dotted lines a suitable series of piston pin holes extending through the pin the entire length thereof.

The piston pin 26 in the present embodiments is provided with a multiple number or series of holes of any predetermined size, shape and number which can be formed by suitably selected procedure such as by machining, extruding, forging or other practicable process. Some or all of these holes may be the entire length of the pin or may be the partial length thereof and may extend from either one end or both ends thereof. Thus, in certain instances the holes may be selected to extend entirely through the piston pin. In other instances only one or a plurality may extend therethrough and in still other instances the holes may be foreshortened so as to extend into but not through the pin. The foregoing suitable variations are herein illustrated. Thus, FIG. 1 illustrates in section an example of an even number of holes 27 extending entirely through the pin 26. FIG. 2 illustrates in section an example of an odd number of holes 28 also extending entirely through the pin 26. FIG. 3 is a full side elevation of a pin 26 illustrating an example of either an even number or an odd number of holes 29 extending through the pin the length thereof.

As later described FIGS. 12, 13, and 15 illustrate full side elevations of pins wherein either even or odd numbers of holes of any selected number extend only part way into the pins while FIG. 14 illustrates a pin having any selected number of holes in which certain thereof extend through the pin and others only part way.

Figure 4:
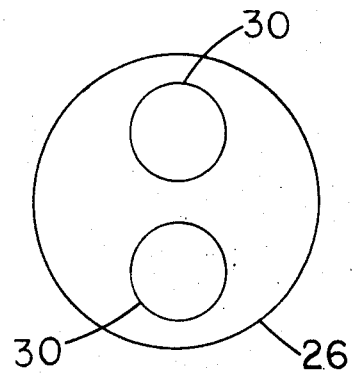
FIG. 4 illustrates the end view of a pin having an even number, namely, two piston pin holes.

In FIG. 4 to 11 inclusive there are shown for any predetermined piston or pistons in substantially the full size herein selected a series of end views of piston pins 26. In this views and in each instance a plurality or multiple number of even or odd numbers of holes of desired lengths are illustrated, these holes being formed as by any effectual method or process hereinbefore specified. In FIG. 4 the piston pin holes 30 of desired size are positioned one directly above the other. In FIG. 5 there are shown three angularly arranged pin holes 31 of somewhat lesser size than in FIG. 4. In FIG. 6 the two pairs of holes 32 of smaller size are annularly arranged with one pair vertically opposed and the other pair horizontally opposed. In FIG. 7 the five smaller size holes 33 are annularly arranged and equally spaced apart. This is applicable to the six smaller size holes 34 shown in FIG. 8. In FIG. 9 the four piston holes 35 are arranged as in FIG. 6 but as distinguished therefrom are substantially rectilinear or square. In FIG. 10 the three pin holes 36 of piston pin 26 are arranged as in FIG. 5 but as distinguished therefrom are somewhat larger and oval in shape. In FIG. 11 the three pin holes 37 of pin 26 are also arranged substantially as in FIG. 5 but distinguished therefrom by being approximately triangular in shape. Thus, in FIGS. 9 to 11 the holes are non-circular in shape although being formed with angularly related sides, such holes being spaced equal distances apart.

In FIG. 12 two similar pin holes 38 are illustrated in the pin 26. These holes extend from opposite ends of the pin part way in the length thereof and in this example preferably a major portion of this length, each terminating short of the end opposite the end whence the pin hole commences. In the example illustrated in FIG. 13 the two pairs of holes 39 originate from opposing ends of the pin and are foreshortened as to the length of the pin. In FIG. 14 the pin hole 40 extends the length of the pin 26 as in FIG. 3, whereas the hole 41 is foreshortened as at 38 in FIG. 12. In FIG. 15 the pin holes 42 extend from the same end of the pin and are foreshortened so as to terminate short of the opposite end of the pin as at 38 in FIG. 12.

I claim:

1. A piston for an engine including a head having ring groove means and spaced depending opposed piston pin bosses formed with transversely aligned openings, a one piece piston pin securely mounted in said openings and provided with a multiple number of eccentrically disposed holes of predetermined size, shape and number extending longitudinally of said pin, one thereof extending a predetermined distance less than the length of the pin, said pin as a unitary one piece unit containing only said eccentrically disposed holes.

2. A piston according to claim 1 wherein an even number of holes are provided.

3. A piston according to claim 1 wherein an odd number of holes are provided.

4. An aluminum alloy piston for use in an internal combustion engine, said piston including a head having laterally spaced piston pin bosses apertured to receive in fixed relation to the head and bosses a one piece piston pin formed with a plurality of eccentrically disposed holes extending selected distances in the length thereof, said pin comprising a unitary one piece unit and being of predetermined diameter, said holes being arranged one above another and with at least one thereof extending less than the length of the pin, said pin containing only said eccentrically disposed holes.

5. A piston for an internal combustion engine having a head and laterally spaced depending pin bosses formed with transversely aligned openings, a one piece piston pin secured in said openings to said bosses, said pin being formed with a plurality of holes all eccentrically disposed, said holes being noncircular and certain thereof extending less than the length of the pin, said pin containing only holes that are eccentrically disposed.

6. A piston for an engine having a head and laterally spaced depending pin bosses formed with transversely aligned openings, a one piece piston pin securely mounted in said openings and formed with a plurality of eccentrically disposed holes extending in the length thereof and spaced predetermined distances apart, at least one of said holes is foreshortened to extend less than the length of the pin, said pin containing only said eccentrically disposed holes.

* * * * *